(12) United States Patent
Rubin et al.

(10) Patent No.: US 10,560,441 B2
(45) Date of Patent: Feb. 11, 2020

(54) DATA SECURITY OPERATIONS WITH EXPECTATIONS

(71) Applicant: Amazon Technologies, Inc., Seattle, WA (US)

(72) Inventors: Gregory Alan Rubin, Seattle, WA (US); Gregory Branchek Roth, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 462 days.

(21) Appl. No.: 14/574,337

(22) Filed: Dec. 17, 2014

(65) Prior Publication Data

US 2016/0182470 A1 Jun. 23, 2016

(51) Int. Cl.
*H04L 29/06* (2006.01)
(52) U.S. Cl.
CPC ............ *H04L 63/06* (2013.01); *H04L 63/102* (2013.01); *H04L 63/20* (2013.01); *H04L 63/101* (2013.01)
(58) Field of Classification Search
CPC ................................ H04L 63/06; H04L 63/20
See application file for complete search history.

(56) References Cited

U.S. PATENT DOCUMENTS

| 8,645,697 | B1 | 2/2014 | Emigh et al. |
| 9,071,429 | B1* | 6/2015 | Roth ................... H04L 9/3268 |
| 2013/0054967 | A1 | 2/2013 | Davoust et al. |
| 2013/0332606 | A1* | 12/2013 | Subramaniam ..... H04L 63/0815 709/225 |
| 2013/0340519 | A1 | 12/2013 | Kurth et al. |
| 2014/0020072 | A1* | 1/2014 | Thomas .............. H04L 63/0815 726/7 |
| 2014/0050317 | A1 | 2/2014 | Sabin |
| 2014/0109645 | A1 | 4/2014 | Ramsay |
| 2014/0229270 | A1* | 8/2014 | Rashwan ........... G06Q 30/0641 705/14.43 |
| 2014/0229729 | A1 | 8/2014 | Roth et al. |
| 2014/0250491 | A1 | 9/2014 | Fleischman et al. |

(Continued)

FOREIGN PATENT DOCUMENTS

| CN | 104242933 A | 12/2014 |
| JP | H8101868 A | 4/1996 |
| JP | 2003224563 A | 8/2003 |

(Continued)

OTHER PUBLICATIONS

International Search Report and Written Opinion dated Sep. 26, 2016, in International Patent Application No. PCT/US2016/065638, filed Dec. 14, 2015.

(Continued)

*Primary Examiner* — Mohammad A Siddiqi
(74) *Attorney, Agent, or Firm* — Davis Wright Tremaine LLP

(57) ABSTRACT

A cryptography service allows for management of cryptographic keys and for the evaluation of security expectations when processing incoming requests. In some contexts, the cryptography service, upon receiving a request to perform a cryptographic operation, evaluates a set of security expectations to determine whether the cryptographic key or keys usable to perform the cryptographic operation should be trusted. A response to the request is dependent on evaluation of the security expectations.

22 Claims, 7 Drawing Sheets

(56) References Cited

U.S. PATENT DOCUMENTS

2015/0358161 A1* 12/2015 Kancharla .......... H04L 63/0485
713/164
2016/0080368 A1* 3/2016 Heurich ............. H04L 63/0853
713/156

FOREIGN PATENT DOCUMENTS

| JP | 200557417 A | 3/2005 |
| JP | 2007507175 A | 3/2007 |
| WO | WO2012120313 | 9/2012 |

OTHER PUBLICATIONS

Australian Examination report No. 1 for standard patent application dated Jan. 16, 2018, Patent Application No. 2015381756, filed Dec. 14, 2015, 4 pages.

Australian Examination report No. 2 for standard patent application dated Jul. 31, 2018, Patent Application No. 2015381756, filed Dec. 14, 2015, 4 pages.

Australian Examination Report No. 3 for Standard Patent Application dated Jan. 4, 2019, Patent Application No. 2015381756, filed Dec. 14, 2015, 3 pages.

Canadian Office Action dated Apr. 16, 2018, Patent Application No. 2969740, filed Dec. 14, 2015, 3 pages.

European Communication Pursuant to Article 94(3) EPC dated Sep. 4, 2018, Patent Application No. 15871327.1, filed Dec. 14, 2015, 4 pages.

Japanese Final Notice of Reasons for Rejection dated Apr. 2, 2019, Patent Application No. 2017-529786, filed Dec. 14, 2015, 3 pages.

Japanese Notification of Reasons for Refusal dated Jul. 3, 2018, Patent Application No. 2017-529786, filed Dec. 14, 2015, 6 pages.

Korean Notice of Preliminary Rejection dated Jan. 2, 2019, Patent Application No. 10-2017-7018309, filed Dec. 14, 2015, 6 pages.

Singaporean Invitation to Respond to Written Opinion and Second Written Opinion dated Feb. 13, 2019, Pat. Appl. No. 11201704602Q, dated Dec. 14, 2015, 6 pages.

Singaporean Invitation to Respond to Written Opinion and Written Opinion dated Feb. 22, 2018, Patent Application No. 11201704602Q, filed Dec. 14, 2015, 6 pages.

Korean Notice of Allowance dated Jul. 25, 2019, Patent Application No. 10-2017-7018309, filed Dec. 14, 2015, 2 pages.

Japanese Decision of Refusal dated Oct. 29, 2019, Patent Application No. 2017-529786, filed Dec. 14, 2015, 4 pages.

Chinese First Office Action dated Aug. 29, 2019, Patent Application No. 201580067659.1, filed Dec. 14, 2015, 11 pages.

* cited by examiner

DATA SECURITY OPERATIONS WITH EXPECTATIONS

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Oftentimes, cryptographic keys from multiple sources may be used in a computer network or system for security purposes, for example, in the use of encryption for the purposes of preventing unauthorized access to data. However, it is challenging ensuring that cryptographic operations are performed using keys that are trusted to avoid using cryptographic keys from known untrusted entities (e.g., hackers).

BRIEF DESCRIPTION OF THE DRAWINGS

Various embodiments in accordance with the present disclosure will be described with reference to the drawings, in which.

DETAILED DESCRIPTION

Figure 1:
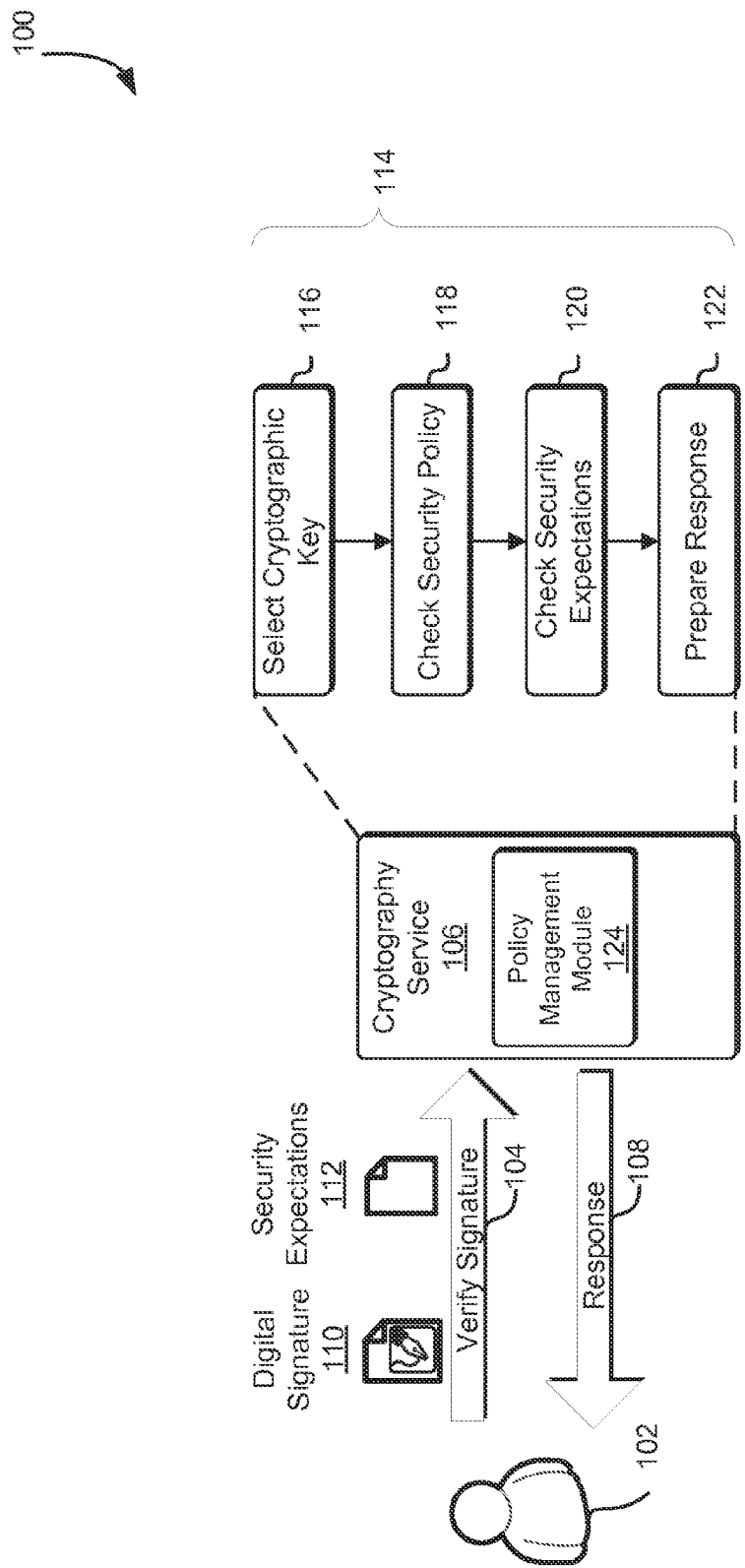
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include secure management of encrypted resources in a multi-tenant configurable service through the use of security expectations in the performance of cryptographic operations involving the validation of data, such as in decryption and validation of encrypted resources. In an embodiment, a multi-tenant, API configurable cryptography service is configured to receive requests (e.g., API requests, also referred to as API calls) from a client to perform cryptographic operations, such as decryption of encrypted data and digital signature verification. Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

The cryptography service may employ various mechanisms to ensure the security and integrity of the service and of the data accessible via the service. A mechanism that may be used within the multi-tenant configurable cryptography service is the use of security policies. As discussed in more detail below, a security policy (referred to briefly as simply a policy) is information that defines privileges in a computer system, such as privileges relating to the access of data and privileges for causing the computer system to perform operations, such as API request fulfillment. In some embodiments, cryptographic keys may be used by the cryptography service to perform cryptographic operations for various purposes, such as ensuring the secure communication and/or storage of data. Cryptographic keys (also referred to as "keys" when clear from context) may be used in such an environment to, for example, encrypt and decrypt data, generate, and authenticate digital signatures.

In some embodiments, operations using cryptographic keys such as operations performed to fulfill DECRYPT and VERIFY_SIGNATURE API calls may further specify security expectations that must be satisfied in order to perform the corresponding cryptographic operation. A security expectation is a condition or set of conditions that are evaluated as part of fulfillment of a request (e.g., an API call, which may be submitted by and/or authorized by a customer of a service provider). In other words, security expectations indicate how an API call is to be fulfilled. Security expectations may include conditions based at least in part on: a minimum number of bits of security protection, a set of whitelisted keys (e.g., a set of cryptographic keys that can be trusted, which may include a subset of cryptographic keys managed by another customer of the service provider), a set of blacklisted keys (e.g., a set of cryptographic keys that are not to be trusted, which may include a subset of cryptographic keys managed by another customer of the service provider), a validity date for which the cryptographic key must have an expiry date within, arbitrary code for evaluating whether the cryptographic key should be trusted, and/or any combination thereof. Conditions for security expectations, in some embodiments, may be evaluated against information in a request that indicates (e.g., states and/or cryptographically proves such as through remote attestation) that the requestor is in a certain state (e.g., Federal Information Processing Standards (FIPS) mode). Further, security expectations may, like security policies, cause fulfillment of requests to be allowed or denied (e.g., by not providing plaintext in response to a decrypt request when a decryption key is not trusted and security expectations require trust of the decryption key), but can have more complex effects as well. For instance, the effect of a security expectation may cause a digital signature validation request to be different, depending on a trustedness of a cryptographic key used to perform the validation. In other words, security expectations can cause the same API request to be fulfilled differently, such as by returning different results dependent on fulfillment of the security expectations.

A security expectation may be ancillary to a primary purpose of a request. For example, a cryptography service may receive a request to validate (verify) a digital signature. In some examples, (e.g., when security expectations do not so require), the request may be fulfilled by verifying that the digital signature is correct without performing any operations in connection with trust of the cryptographic key used to verify the digital signature. In other examples, security expectations may require that the request to validate the digital signature to verify both that the digital signature is correct but also that the cryptographic key used to verify the digital signature is one specified as trusted (e.g., because the cryptographic key is cryptographically verifiable as associated with a trusted entity and/or because the cryptographic key is specified in a non-expired digital certificate). Furthermore, in some embodiments, conditions and/or expectations may be combined using logical operators to form an aggregate condition and/or expectation whose result is based at least in part on the components of the aggregate condition and/or expectation in conjunction with the logical operator. The aggregate conditions may, in turn, contain multiple levels of aggregation and form complex, multi-level aggregate conditions and/or expectations.

In some embodiments, the security expectation may be provided or otherwise specified by the client, for example, as an additional piece of information provided as part of the request to perform the operation using the cryptographic key. In other embodiments, security expectations may be associated with the principal making the request such that a set of security expectations is applied to all cryptographic keys that are used by the principal. In yet other embodiments, the security expectation may be associated with the account or determinable from the request context. It should be noted that these embodiments are not necessarily distinct and/or mutually exclusive from each other. In other words, in some examples, security expectations are explicit in a request and in other examples information in the request may be used to determine whether any security expectations apply and, if so, which security expectations apply.

Security expectations may be provided to the cryptography service by a client, or may be centrally managed by the cryptography service (e.g., via web service API calls for the management of computing resources). In some embodiments, the security expectations are stored in a centrally managed repository accessible by the cryptography service and are managed by a policy management module accessible by the cryptography service. The policy management module may be a software, hardware, or combination of hardware and software accessible by the cryptography service, and in some embodiments may be part of a frontend system that includes both computing resources (e.g., CPU, virtual machine instance) and data storage. The computing resources may be used at least in part to evaluate expectations, retrieve security expectation and/or policy data, and run executable code that may be included as part of security expectations.

Furthermore, in some embodiments, such as those where the security expectations are centrally managed by a policy management module accessibly by the cryptography service, users (e.g., customers) benefit from greater resilience to security compromises. As an example, when a particular cryptographic key has been discovered to be compromised, the policy management module may blacklist the key (i.e., include the compromised cryptographic key in a set of keys that will automatically fail all security expectation evaluations). In contrast, in embodiments where security expectations are provided to the cryptography service by the client as part of a request, all clients that may use the comprised cryptographic key may need to be updated to blacklist the compromised cryptographic key.

In some embodiments, the cryptography service may allow programmatic configuration of requirements that cryptographic keys are trusted before they can be used. In this context, trust refers to computer system operation dependent on whether a cryptographic key is trusted. For example, a computer system may be configured such that a trusted cryptographic key may be used to encrypt data accessible from the cryptography service, whereas a cryptographic key that has not been determined to be a trusted cryptographic key may not be used to encrypt data accessible form the cryptography service. Generally, output of computer-implemented methods is dependent on whether a cryptographic key is specified as trusted.

There are various advantages embodiments in which the cryptography service requires cryptographic keys are trusted before they can be used by a client. These advantages include, at least, that the data in the computing environment using the cryptography service will only exist in either an invalid state or valid state, as opposed to a more complex system where data can have multiple other states, such as when a digital signature is correct, but not verifiable using a trusted cryptographic key. Invalid states include at least states where encrypted data or digital signatures have been detected to have been altered (e.g., by a malicious party or inadvertently) and therefore lacks integrity, or where the data is deemed to be un-altered (i.e., has integrity) but uses a cryptographic key of a party that may be known to be untrusted, compromised, or otherwise lacks a basis for the client to trust the party. Cryptography services in accordance with this disclosure are able to be configured to avoid inadvertent use of intermediate states of validity such as where data correctly signed but is untrusted due to a cryptographic key usable to verify the digital signature not being trusted.

In some embodiments, a client, by default, trusts a limited set of cryptographic keys. For example, a client may, by default, initially only trust data from any of the accounts within the client, from a particular account of the client, or even a particular cryptographic key of the client. In the described embodiment, cryptographic keys from third-parties (i.e., cryptographic keys that are from other clients) are not trusted, and cannot be used by the client to perform cryptographic operations. Application programming interface calls may be used to configure a cryptography service to perform cryptographic operations in accordance with the cryptographic keys trusted by the client.

FIG. 1 illustrates an environment 100 in which various embodiments can be implemented. The environment 100 illustrates a client 102 issuing a request to complete a cryptographic operation 104 to a cryptography service 106, and a response 108 to the request. For illustration, the operation 104 is a VERIFY_SIGNATURE operation wherein the client provides a digital signature 110 and security expectation 112. To fulfill the request to perform the operation, the cryptography service can verify the digital signature for both authenticity and trustedness of the key used to determine authenticity. The response may, for instance, specify whether the digital signature was determined to be correct. Other information may be included in the response when applicable, such as whether a digital certificate used to verify correctness of the digital signature was successfully authenticated, whether the cryptographic key used to verify the digital signature is trusted, whether the digital certificate is unexpired, and/or other information resulting from any checks performed in addition to checking whether the digital signature is correct. Note that VERIFY_SIGNATURE is used for the purpose of illustration, but other cryptographic operations may be used, such as DECRYPT or others. The client 102 may be a computer system configured (e.g., with executable code) to perform various operations described herein. The client may operation in accordance with a client application, operating system, or other suitable software, hardware, or combination thereof that is capable of being configured to operate as discussed herein.

In an embodiment, the request 104 to verify a digital signature includes at least the digital signature to verify, the message over which the digital signature was purportedly generated, and, in some embodiments, may also include or otherwise specify (e.g., by an identifier) the cryptographic key to verify the signature. In some embodiments, the request does not include or otherwise specify the cryptographic key, but may include information usable by the cryptography service to select the cryptographic key—for example, an identifier of an entity submitting the request or other information usable to select the cryptographic key from multiple cryptographic keys managed by the cryptography service may be included to enable the cryptography service to select the cryptographic key. As an illustrative example, a customer of a computing resource service provider may have an associated default cryptographic key to use.

It should be noted that key identifiers may be, but are not necessarily unique identifiers. For instance, a key identifier may identify a family of cryptographic keys. For example, in some embodiments, key rotation is performed. Key rotation may involve replacing keys with other keys to prevent collection of enough decrypted data to allow practical cracking of a cipher used. It should further be noted that, when a key identifier does not uniquely identify a key, various techniques may be employed to enable proper functionality. For example, in various embodiments, a family of keys identified by a key identifier is finite. If a decryption operation using a key identified by a key identifier is requested, additional data (e.g., a time stamp of when the encryption was performed) may enable determining the proper key to use. In some embodiments, ciphertexts may include information indicating a key version. In some embodiments, all possible keys are used to provide different decryptions of the data which may be hashed and the resulting hashes may be compared against stored hashes to identify the key to use. Since there are a finite number of keys, the proper decryption may be selected from those provided. In some embodiments, decryption with a key is performed in a manner that enables the cryptography service to detect that the ciphertext was not generated based at least in part on the key, such as by using authenticated encryption. Other variations are also considered as being within the scope of the present disclosure.

The cryptography service 106 may receive requests from the client and, in response to the request, determine how to handle the request based on the correctness and trustedness of the data and also based at least in part on metadata provided as part of the request. The cryptography service may perform a series of operations 114 to determine the correctness and trustedness of the digital signature 110 and how to handle the request. The digital signature (referred to simply as a signature when clear from context) is information usable to demonstrate the authenticity of a digital message and provide assurances that a message was created by a particular known sender (authentication), that the sender cannot deny having sent the message (non-repudiation), and that the message was not altered in transit (integrity). Digital signatures currently in use include various versions of Public-Key Cryptography Standards (PKCS) and the Digital Signature Algorithm (DSA). The series of operations 114 may include at least the following steps: selecting 116 a cryptographic key, determining 118 whether security policies applicable to the principal are satisfied, determining 120 whether security expectations applicable to the cryptographic key are satisfied, and preparing 122 a response to the request. The cryptography service may include or have access to data from multiple users from the same account which may, in some circumstances, be shared amongst each other, and, conversely, may also include data from multiple independent customers whose data should not be shared amongst each other. Such a configuration may be desirable to, for example, optimize computing and/or storage resources, reduce latency, increase bandwidth, etc. In some embodiments, customers are assigned to computing resources dynamically (e.g., based on availability of computing resources across a system) and the customers can be re-assigned to other computing resources (e.g., based on a change in availability of computing resources across a system).

The selecting 116 of a cryptographic key may be based at least in part from the context of the request 104. In various embodiments, the request 104 includes an additional parameter specifying a key identifier and/or the key identifier may be derived based on the calling client or account associated with the calling client. In addition or alternatively, the cryptographic key may be included in the request 104 and provided to the cryptography service by the client.

Determining 118 whether security policies applicable to the principal are satisfied may include identifying and obtaining one or more applicable security policies (e.g., by obtaining one or more electronic documents that encode the one or more applicable security policies) and evaluating whether the applicable security policies are satisfied. Security policies applicable to the principal may be obtained from a policy management module 124 and may be based at least in part on the client making the request and/or information provided as part of the request. In some embodiments, the principal is, by default, associated with the identity of the client (e.g., the machine, account, or user associated with the client) but the default association may be overridden based on additional information provided as part of the request.

The policy management module 124, in an embodiment, is a computer system that is configured with programming logic for managing storage and retrieval of security policies and associating security policies to principals. In some embodiments, a security policy may, as part of the data stored in the security policy, include information associating the policy to a principal. In other embodiments, a mapping from security policies to principals may exist, for example, through the use of an associative array wherein the key of the key-value pair resolves uniquely to a principal or through the use of a relational database wherein security policy records include a foreign key field that matches the associate principal's record. In some embodiments, group policies may also exist, wherein a security policy applies to a plurality of principals. Generally, the policy management module 124 is configured to use information associated with the request (e.g., information in the request and/or contextual information of the request and determined outside of the request). Upon obtaining the applicable security policy or security policies from the policy management module, the cryptography service may evaluate whether the applicable security policy or policies is satisfied.

In some embodiments, the applicable security policy may be associated with a principal that is distinct from the calling client. For example, in some embodiments, the client may provide additional information in the request that indicates the applicable security policy of a different actor should be used in identifying the applicable security policy. For example, as part of the request, the client may include a digitally signed token from a second client wherein the token includes information specifying that the second client authorizes the first client to issue requests based on the second client's security policies. In such a configuration, the principal will be the second client, rather than the first (calling) client. In other embodiments, the principal may be distinct from the calling client.

Determining 120 whether security expectations applicable to the cryptographic key are satisfied may include identifying and obtaining one or more applicable security policies and evaluating whether the applicable security expectation or expectations are satisfied. In various embodiments, security expectations applicable to the cryptographic key may be identified, obtained, and evaluated by the cryptography service, the policy management module, and/or a distinct hardware component such as a hardware or other security module (HSM) or other device with hardware-based protection of cryptographic material (e.g., a hardware token) such as a trusted platform module (TPM) or other device configured to implement one or more services configured to implement techniques described herein.

In some embodiments, preparing 122 a response to the request is generated based at least in part on whether the applicable security expectation (or expectations) are satisfied. Where a security expectation (or expectations) is satisfied, the cryptography service may fulfill the request in accordance with the security expectations. Evaluating the security expectation may include determining whether the cryptographic key to be used to fulfill the cryptographic operation should be trusted and the evaluation may have various modes of operation. Modes of operation determine how the trustedness of the cryptographic key is evaluated. In some embodiments, the modes of operations may be specified in the request, or may be set by the cryptography service.

Figure 2:
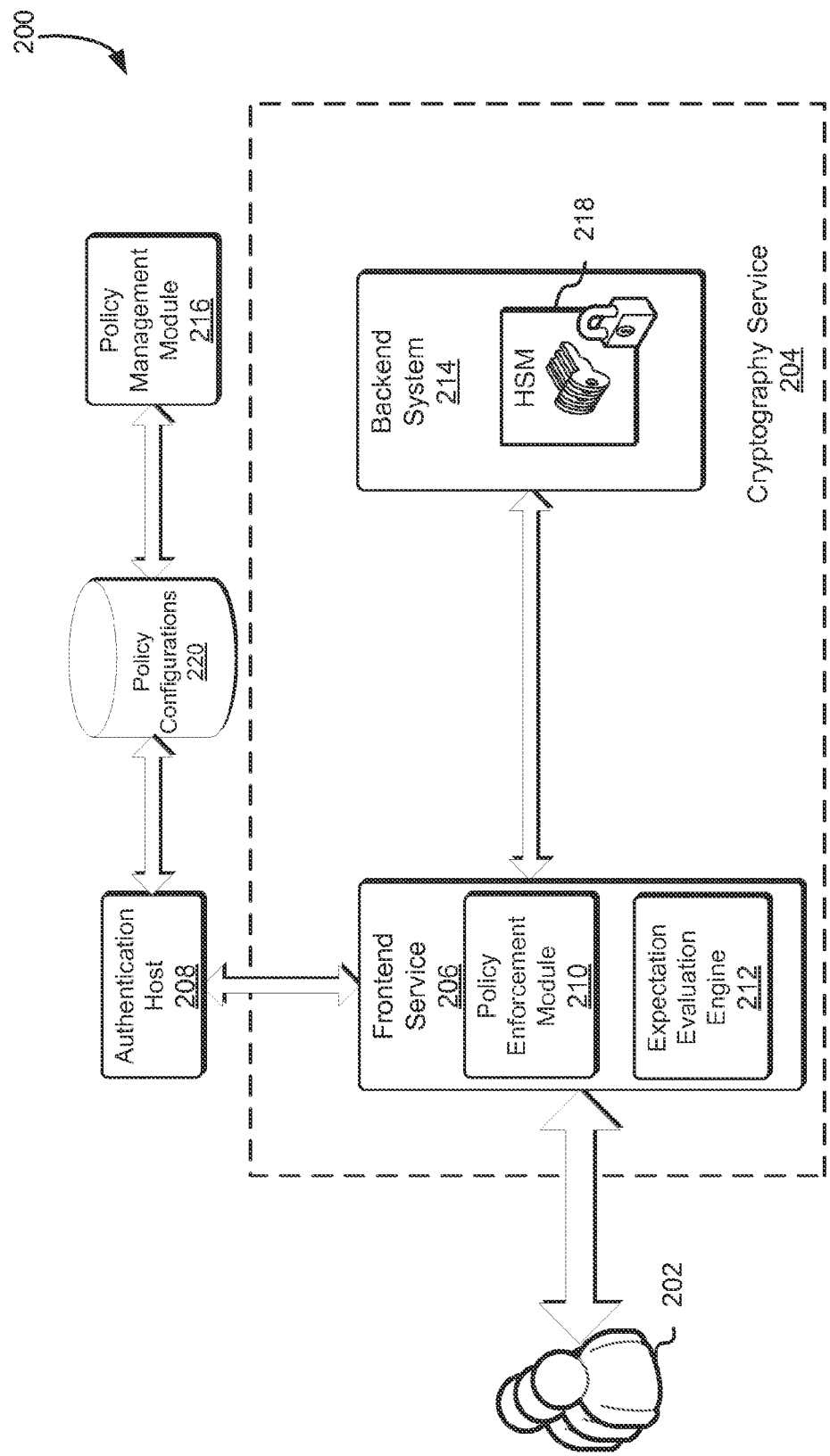
FIG. 2 illustrates an environment in which various embodiments can be implemented.

FIG. 2 shows an illustrative example of an environment 200 in which various embodiments can be practiced. In an embodiment, clients 202 (also referred to as requestors) may make requests to the cryptography service 204 which is a computer system comprised of a frontend 206 including a policy enforcement module 210, and an expectation evaluation engine 212. The frontend 206 is a computer system configured to access an authentication host 208 and a policy management module 216 that is configured to access, create, delete, and update policy configurations 220. The cryptography service also includes a backend 214 system that includes one or more hardware security modules (HSMs)—for purposes of clarity, a single HSM 218 is shown. An example cryptography service is described in U.S. patent application Ser. No. 13/764,963, filed Feb. 12, 2013 titled "Data Security Service," which is incorporated herein by reference.

In an embodiment, a service frontend host 206 receives a request from one or more clients and communicates with an authentication host 208 to determine how to process the request. An authentication host 208 may be a computer system, computer system process, program application, service module, or a combination of these and/or other such computing system entities. The authentication host 208 may be utilized by the cryptography service to determine whether and/or how to process requests submitted to the frontend 206. The authentication host may, for instance, verify digital signatures of requests submitted to the cryptography service or otherwise may determine whether fulfillment of requests is authorized. Further, while a customer/provider relationship is discussed throughout the present disclosure for the purpose of illustration, the techniques described herein are adaptable to other contexts, such as when the customer is an internal customer of the cryptography 202 (e.g., another internal service of the service provider 202).

A policy management module 216 is an illustrative example of a service or subsystem of the cryptography service that is operable to provide information about policies and policies themselves, where applicable. The policy management module may be operable to create, modify, delete, copy, or propagate policy configurations 220. An illustrative policy configuration (an example of which is a policy document and which may be referred to as a policy when clear from context) is described in more detail below in FIG. 3. Returning to FIG. 2, components of the frontend 206 such as the policy enforcement module 210 may use an application programming interface (API) to interact with the policy management module 216, and by extension, policy configurations 220. In some embodiments, the client request may be passed directly to the policy management module, but in others, the frontend or a component therein (e.g., an authentication host) may parse the client request, generate a request in the format acceptable to the policy management module, and dispatch that request to the policy management module. In FIG. 2, the policy management module is shown to be implemented as a service separate from both the frontend and backend. However, the policy management module may, in other embodiments, be implemented as part of the backend 214 (i.e., access to policy configurations are directed to the backend 214 rather than an intermediary service). In such an embodiment, the requests directed to the backend 214 are still performed by the policy management module.

Policy configurations 220 may be created, modified, copied, deleted, or inherited by users, security administrators, system administrators, or other principals with sufficient privileges. In some embodiments, whether a principal has sufficient privileges to create, modify, copy, delete, or inherit a policy may be based on the policy that the principal attempts to create, modify, copy, delete or inherit. For example, a security administrator may have sufficient privileges to create a policy to deny a guest user access to a resource, whereas the guest user may not have sufficient privileges to create a policy to deny the security administrator access to a resource. Policy configurations may be stored using various computer-based hardware and/or software components including any combination and number of data servers, databases, data storage devices and data storage media, in any standard, distributed, virtual or clustered environment.

In an embodiment, when a service frontend host 206 receives a request from the customer network 202, the service frontend host 206 submits an authentication request to an authentication host 208 which provides an authentication response which, in an embodiment, specifies whether the request to the service frontend host 206 is authentic (e.g., whether a digital signature of that request was successfully verified) and information specifying a set of policies applicable to the request. Upon receiving a set of policies, the service frontend host 206 may utilize the policy enforcement module to determine how to process the request such as whether to fulfill or deny the request. Further, upon determining that the request should be fulfilled at least in part, the expectation evaluation engine 212 may be used to determine how to request should be fulfilled. The expectation evaluation engine may be used to evaluate the request in accordance with security expectations which may be provided by the client and/or by the cryptography service (e.g., by an applicable policy configuration).

Although the expectation evaluation engine is illustrated as a component of the frontend, it may, alternatively, be included as part of the backend 214 or included as part of the HSM 216 or other suitable device with hardware-based protection of cryptographic material. Once policies are received from the policy management module 216, the service frontend host 206 may provide those policies to the policy enforcement module to evaluate how to process the request (e.g., whether the polices allow fulfillment of the request and/or how fulfillment should proceed). The policy enforcement module 216 may perform various tasks related to the authorization of policies such as enforcement of default policies (e.g., determine how fulfillment should proceed in the absence of explicitly defined policies) and determining how conflicts between multiple policies affects processing of the request (e.g., determine how fulfillment should proceed where multiple policies are applicable). In some embodiments, the policy management module may receive a set of policies and a request context, and in response, provide a determination of how the request should be fulfilled (e.g., allow or deny the request).

The backend 214 is operable to store and access cryptographic keys and may include at least a hardware security module (HSM) or other device with hardware-based protection of cryptographic material (e.g., a hardware token). The backend may store and access cryptographic keys from a plurality of clients in a multi-tenant system, wherein the cryptographic keys of one client are not, by default, accessible to other clients within the system.

Figure 3:
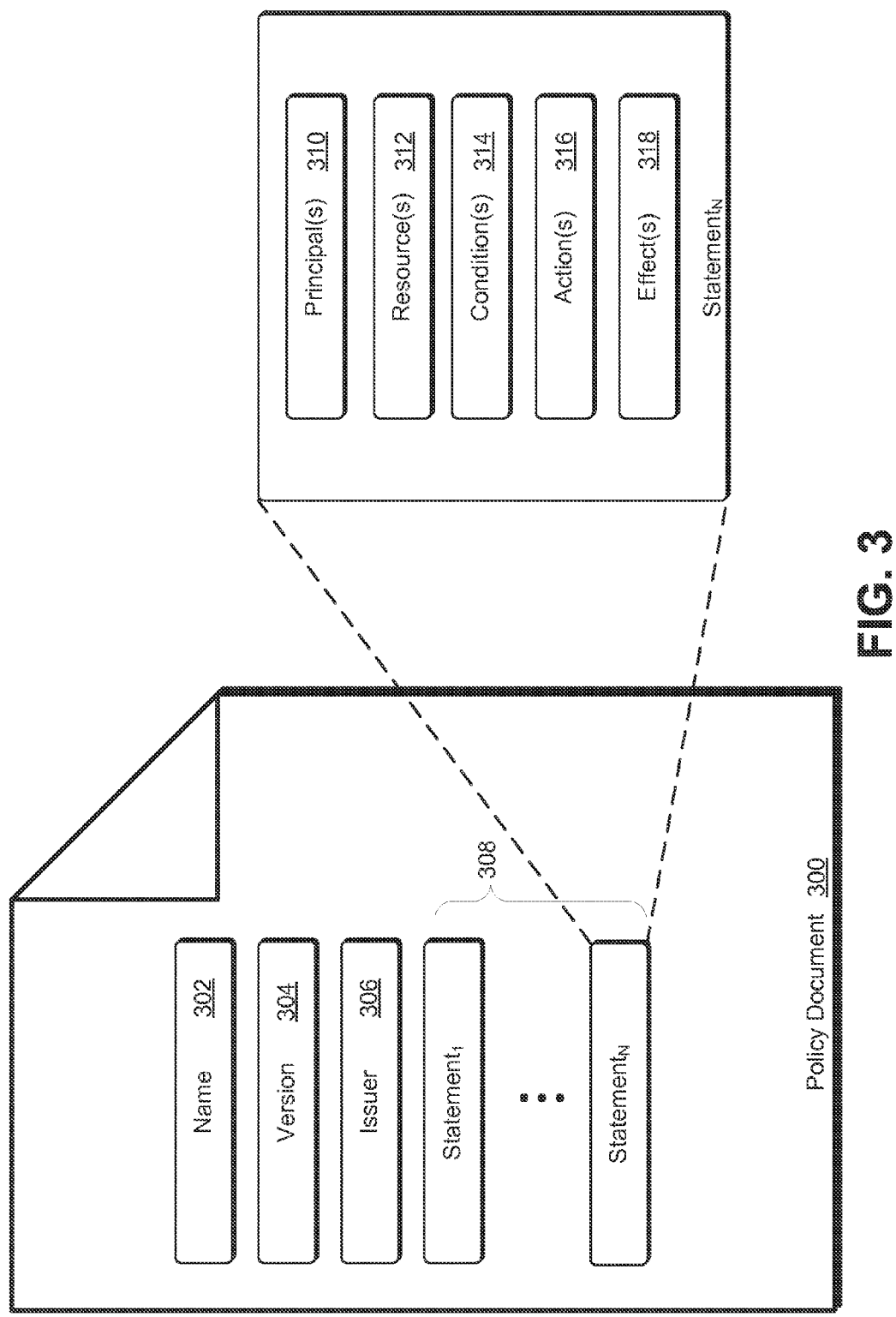
FIG. 3 illustrates a security policy in accordance with an embodiment.

FIG. 3 shows an illustrative example of a policy document (an example policy configuration) in accordance with an embodiment. In an embodiment, the policy document 300 encodes various information relevant to a policy encoded by the policy document. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a request to be fulfillable. As illustrated in FIG. 3, the policy document 300 includes a name 302 which may comprise a string for the policy document 300. The name 302 may, for instance, be used to provide a convenient identifier in using human readable terms. As an example, a name 302 may be a string, for instance, to the effect of "MyDataStoragePolicy." Also as illustrated in FIG. 3, the policy document 300 may include a version 304. The version 304 may be used to track how the policy document 300 changes over time as various requests are received and fulfilled to update policy. Each update to the policy document 300 may cause the version 304 to be updated to a new value. The policy document 300 may also specify an issuer 306 which may be an identifier for a user that submitted a request that resulted in creation of the policy document 300 having the current version. As illustrated in FIG. 3 and noted above, the policy document 300 may include one or more statements 308. Statements in a policy document may be processed using a logical OR.

As noted above, a statement may be a formal description for a permission or, generally, a formal description of one or more conditions on access to one or more resources. FIG. 3 accordingly, shows an illustrative example of a statement 308 which may be encoded in a policy document, such as described above. As illustrated in FIG. 3, the statement 308 may include information identifying one or more principals 310. A principal may be an entity (e.g., user, group of users, class of users, computer system, or any entity that may be granted a permission for access to a system or resource within a system) to which the statement 308 applies.

As an example, a customer of a computing resource service provider may have an account. The account may be associated with multiple subaccounts each corresponding to a user of the customer. Each user may have a corresponding identifier which may be includable as a principal in a statement. Principals may also be identified in other ways. For example, sets of principals may be identified by an identifier for the set. As an illustrative example, a department in an organization may have a corresponding identifier. A statement may be applicable to the users associated with the department by listing in the statement an identifier for the department. Identifiers for sets of principals may be useful, for instance, when the sets are dynamically changing such as when employees are hired by and/or leave an organization and/or department therein.

Generally, sets of principals may be defined based at least in part on characteristics of principals. Identifiers of principals may also be open ended. For example, information may be included that indicate that the statement 308 is applicable to anyone, that is to all users capable of submitting a request on behalf of an account of a computing resource service provider or, generally, all users. In some embodiments, statements must at least identify a principal 310, a resource 312, an action 316, and an effect 318. The principal described in a security policy may, for example, be a user, group, domain, service, computer, person, process, thread, environment, or other type of entity that is capable of being authenticated by the cryptography service. Some examples of principals may include a set of actors (e.g., multiple users or a user group such as 'Administrators'), a set with different types of actors (e.g., a set including a user and a domain), or any combination thereof. Principals may be described heuristically based on properties of the principal or principals, e.g., a principal for a policy may include entities that are connected to the cryptography service via a secure transport lay security (TLS) connection.

The resource described may be a computer-based resource that the policy may be applied to. Resources described in policies include various types of computing resources including but not limited to: computing resources (e.g., processor, computing cluster), computer storage (e.g., computer file, computer disk drive or partition, physical hard drive, magnetic tape data storage), cryptographic resources (e.g., cryptographic keys), computer operations (e.g., APIs or API sets), and system resources (e.g., synchronization primitives). Similar to principals, the resources specified in a policy may apply to a single resource (e.g., a file), a set of resources (e.g., an arbitrary list of files), a combination of types of resources (e.g., computer files and processor), or any combination thereof. Actions of a policy specify what action or set of actions the actor is permitted to perform on the resource or resources specified in the policy. An action may, for example, be a single, specific action such as a single API call (e.g., a 'ListData' API wherein a list all data in stored in a logical container is provided), denote a level of access (e.g., "read" access wherein all read operations—which may include 'ListData'—are included), or some combination thereof.

As illustrated in FIG. 3, a statement 308 identifies one or more resources 312. Resources may be computing resources such as described above. Resources may, for instance, be the subject of the services provided by a computing resource service provider. As an example, a resource may be a virtual computer system, may be a logical data container used to associate data objects together, may be a volume identifier of a block level data storage device, a database, an item stored in a database, a data object (e.g., file) and generally any type of resource which may be provided as a service. In some embodiments, the resources are cryptographic keys, such as cryptographic keys managed by a cryptography service on behalf of customers or other entities (e.g., users, roles, groups, etc.) and/or cryptographic keys used as default keys for one or more data storage services. As with principals, resources may be described using identifiers of sets of resources, which may be defined based at least in part on characteristics of resources. For instance, in some embodiments, virtual computer systems are able to be associated with user generated tags that may be descriptive of a role fulfilled by the virtual computer systems. As an example, a group of virtual computer systems may be associated with a tag "web server." Resources, accordingly, may be identified by such tags. As another example, a resource may correspond to a logical data container thereby causing the statement 308 to be applicable any data objects stored within the logical data container, i.e., associated with the logical data container. Resources (e.g., data objects) may also be defined by keys used to encrypt the resources. In addition to the foregoing, objects to which policy applies (e.g., principals and resources) may be based at least in part on attributes which may be communicated using Security Assertion Markup Language (SAML) and/or attributes that are determined using a directory.

As illustrated in FIG. 3, a statement 308 may also include one or more conditions. The conditions, in an embodiment, are determinative of whether the statement in the policy document applies in a particular context, i.e. applies to a submitted request in the context in which it was submitted. The conditions may utilize Boolean operators (equal, less than, etc.) to allow evaluation of the conditions over other values in the statement (principal, resource, etc.) and other values in an authorization context, which may or may not be provided in a request for which policy is being evaluated. Condition values can include date, time, the Internet Protocol (IP) address of the requester, an identifier of the request source, a user name, a user identifier, and/or a user agent of the requester and/or other values. Values may also be unique to a service to which the condition applies. Conditions may be logically connected for evaluation using logical connectors such as AND and OR.

Statements may also encode one or more actions 316. In an embodiment, an action is an operation performable by a service provider. In an embodiment, actions correspond to API calls supported by the service provider (i.e., API calls that can be made to the service provider that the service provider may fulfill). A specified action may also be an operation that is performed as part of fulfillment of an API call (perhaps multiple different types of API calls) where, for some API calls other operations may also be performed. For instance, fulfillment of an API call may include performance of multiple operations and, in a policy, one or more of the operations may be specified as actions.

As illustrated in FIG. 3, a statement 308 may also include one or more effects 318. The effects, in an embodiment, determine the expected result of a request wherein the actor of a policy attempts to perform an operation specified in the policy on a resource specified in the same policy. The effect may simply to "ALLOW" or "DENY" the operation from accessing the resources. For instance, when the policy encoded by the policy document 300 applies to a request to decrypt, satisfaction of conditions in a statement 308 may cause fulfillment of the request to be allowed or denied according to the effect 318. Conflict resolution rules may be applied in the instance when two different statements have respective statements that are simultaneously fulfillable and the effect differs between the two statements. For instance, a default may be to deny unless explicitly allowed by a policy and a system may be configured such that an explicit deny takes precedence over an explicit allow, or vice versa. An example method involving conflict resolution is discussed below in connection with FIG. 6. An explicit effect (e.g., an explicit allow or an explicit deny) is an effect encoded in policy.

Figure 4:
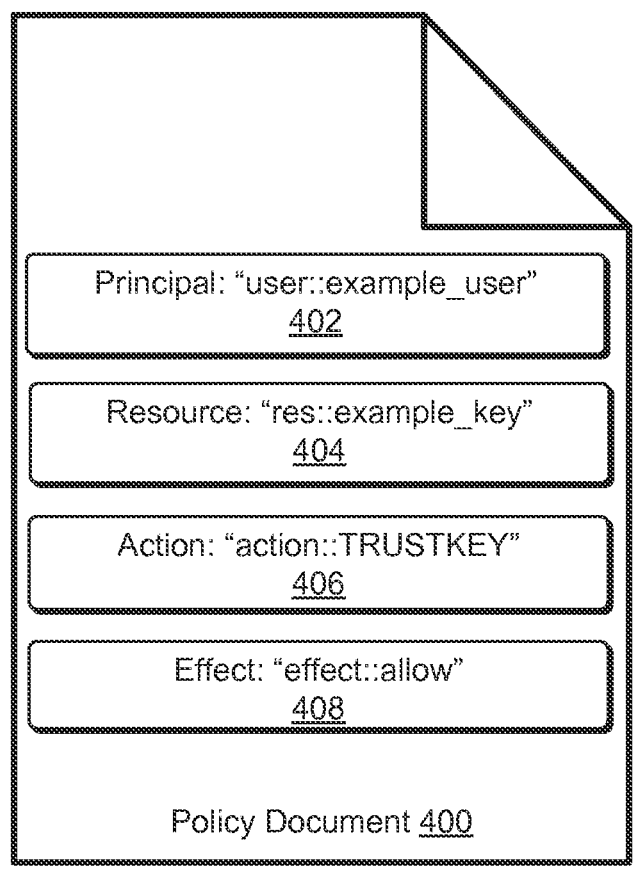
FIG. 4 illustrates an example security expectation using a TRUSKEY action in accordance with an embodiment.

FIG. 4 illustrates an example security policy granting access to use a cryptographic key using the TRUSTKEY action. For purposes of clarity, the policy document 400 is shown with principal, resource, action, and effect only, although the policy document may contain additional information as discussed above in FIG. 3. The TRUSTKEY action 406 authorizes or denies the principal 402 identified in the policy document access to use a resource 404 in performing cryptographic operations based on the effect 408 specified in the policy document. In some embodiments, the resource 404 specified in the policy document 400 may include cryptographic keys and other resources usable in conjunction with a cryptographic key such as encrypted files or encrypted media storage. Note that, in some embodiments, the TRUSTKEY action may correspond to a TRUSTKEY API call while, in other embodiments, the TRUSTKEY action is a part of another API call (i.e., another API call that has an additional action).

In some embodiments, clients may include additional cryptographic keys to the set of trusted cryptographic keys via a TRUSTKEY action to the cryptography service. A TRUSTKEY action will at least describe a cryptographic key or set of cryptographic keys that the client wishes to trust for performing various operations including, at least, cryptographic operations such as encrypting and decrypting data, and generating and validating digital signatures. Only cryptographic keys that are trusted may be used to perform cryptographic operations. In some embodiments, the TRUSTKEY operation may also include conditions that must be satisfied in order for the TRUSTKEY operation to identify the cryptographic key as trusted. In some embodiments, the conditions used in fulfilling a TRUSTKEY operation (or other operation used in connection with determining whether to trust a result of a cryptographic operation) may include the use of properties that are inherent to the cryptographic key. Properties inherent to a cryptographic key may include the key size and other information that can be determined from the key itself.

Figure 5:
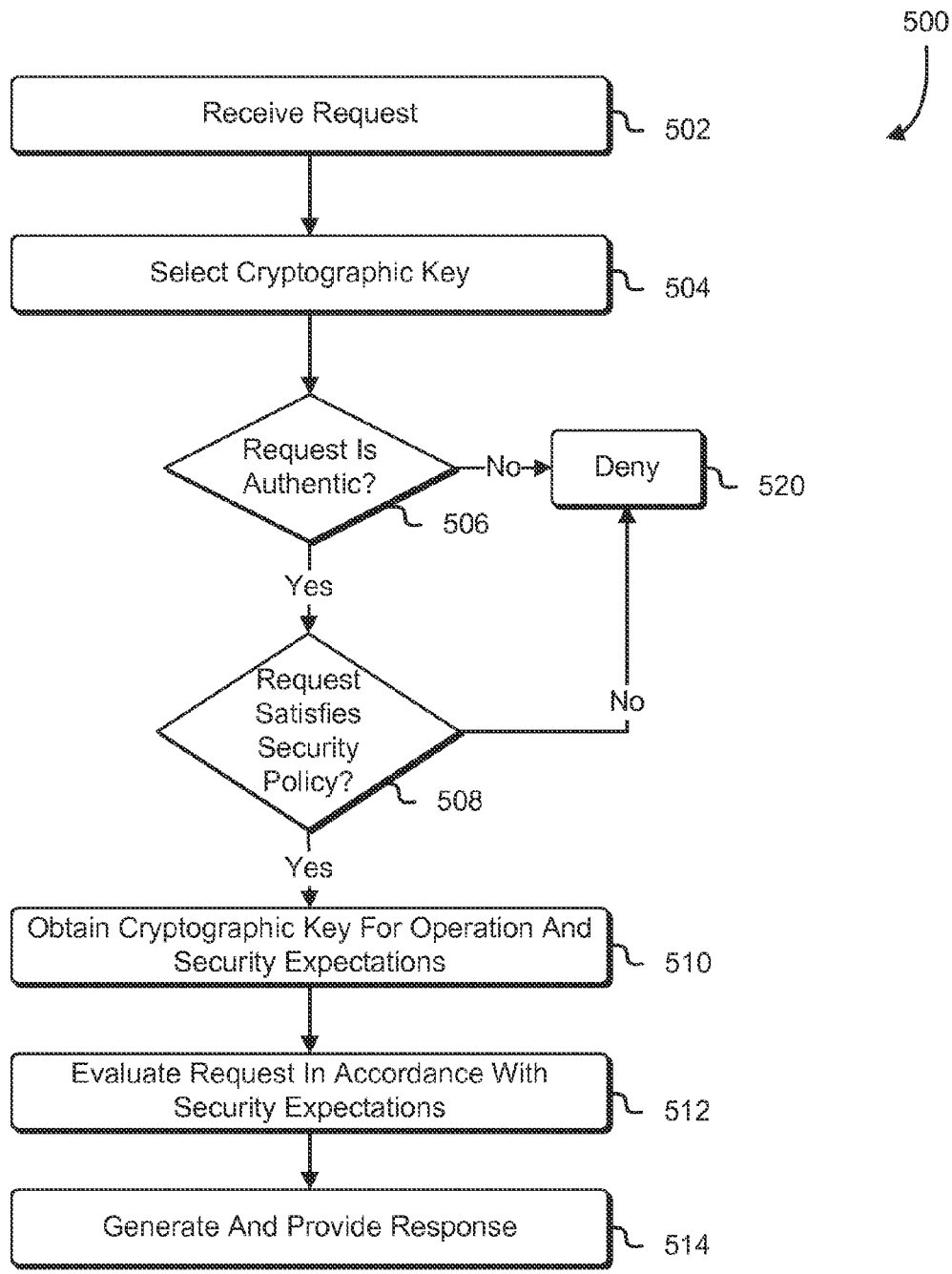
FIG. 5 is an illustrative process for fulfilling a request to perform a cryptographic operation in accordance with an embodiment.

FIG. 5 describes an illustrative example of a process 500 for handling a request in embodiments described above. The process 500 may be performed by any suitable system, such as the cryptography service or a component thereof, such as a web server implementing a frontend, such as described above, or by a web server in concert with an application server and/or security module. For the purposes of illustration, the process described in connection with a cryptography service such as that described in FIG. 2, although other configurations of computing resources to implement a cryptography service are considered as being within the scope of the present disclosure. The cryptography service may receive 502 a request to perform a cryptographic operation. In some examples, the request is a web service request although other API calls are considered as being within the scope of the present disclosure. Further, in some embodiments, the process 500 or a subset of operations thereof may be performed by a hardware device, such as an HSM or other device that provides hardware protection of cryptographic keys and, in some embodiments, from which cryptographic keys are unexportable in plaintext form. Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

For the purposes of clarity, an example DECRYPT operation will be described within the context of FIG. 5. However, the process 500 described may also be used to handle other requests to perform cryptographic operations, such as digital signature verification. The request may be received 502 over a network and, in some examples, is a web service request.

To process the request, in an embodiment, the cryptography service selects 504 a cryptographic key. The cryptographic key may be selected, for instance, based at least in part on an identifier of the cryptographic key in the request that was received 502 and/or other information included in the request, such as described above. Contextual information which may be determined from information external to the request may also be used to select 504 the cryptographic key.

The cryptography service or a component therein checks 506 to determine whether the request is authentic. In some embodiments, an authentication module within or accessible by the cryptography service (such as the authentication host described in FIG. 2) may perform this step. An authentic request is a request in which the identity of the client may be authenticated such that the party receiving the request (i.e., the cryptography service) can be assured that the request was made by particular party (e.g., the client 202, or a third-party delegating the submission of the request to the client 202). In some embodiments, the request is made using authenticated encryption, digital signatures, message authentication codes (MACs), or using cryptographic protocols having properties that enable the cryptography service to authenticate the counterparty (e.g., a TLS connection). It should be noted that the authenticity check is made on the request itself—i.e., for a DECRYPT request, the authenticity check will at least validate the identity of the party issuing the request, and in some embodiments does not verify that ciphertext included in the response is authentic. Upon being unable to determine that the request is authentic (e.g., where a digital signature is tampered with or the digital signature was generated with an incorrect cryptographic key) the cryptography service will deny 520 the request and in some embodiments may return an error to the client and/or take other measures (e.g., inform a security administrator via one or more electronic messages).

Upon determining that the request is authentic, in an embodiment, the cryptography service or a component therein determines 508 whether the request satisfies any applicable security policies. In some embodiments, a policy enforcement module within or accessible by the cryptography service may perform this step. As discussed above, as part of determining authenticity of the request, a set of policies (collectively referred to as security policy) applicable to the request may be obtained, although security policies may be obtained in other ways in other embodiments. The obtained security policy may contain restrictions regarding what actions the principal is allowed to perform and/or what resources may be used in performing the action. For example, some security policies may limit the ability of a less-privileged principal to only allow it to perform "read" or "read"-type cryptographic operations (e.g., DECRYPT) but not allow it to modify or create new content using "write" or "write"-related cryptographic operations (e.g., ENCRYPT). As a second example, some security policies may allow a principal to perform "write" or "write"-related cryptographic operations, but restrict the set of resources that may be decrypted. Upon detecting that a request does not meet the security policy conditions, the cryptography service may deny 520 the request and in some embodiments may return an error to the client and/or take other measures (e.g., inform a security administrator).

As a result of determining that fulfillment of the request satisfies the obtained security policy, in an embodiment, the cryptography service or a component therein obtains 510 the selected cryptographic key to be used to fulfill the cryptographic operation of the received request and security expectations associated with the cryptographic key. As discussed above, a set of security expectations may be obtained from the request and/or from information external to the request (e.g., a set of policies applicable to the request). The set of security expectations, as discussed, may define a set of conditions applicable to the selected cryptographic key that, when fulfilled and regardless of whether the selected cryptographic key is usable to perform the cryptographic operation, indicate that a result of the cryptographic operation is trusted.

In the DECRYPT example, the cryptographic key to be used with the cryptographic operation is a cryptographic key operable to decrypt ciphertext from the request. In some examples, the cryptographic key is stored in a data storage system in encrypted form, only decryptable by a security module of the cryptography service. In such embodiments, the encrypted cryptographic key may be obtained from the data storage system and provided to the security module. In other embodiments, the security module may store the cryptographic key and access the cryptographic key from local data storage. Generally, any way by which the cryptographic key is obtained may be used and the manner by which the cryptographic key is obtained may vary in accordance with various cryptography service configurations. In some embodiments, the cryptography service may use a policy management module or similar component to identify and obtain the security expectations associated with the cryptographic key. In other embodiments, the security expectations may be included at least in part in the request. Note that, while FIG. 5 illustrates obtaining a cryptographic key as part of the process 500, in some embodiments, the cryptographic key may not be obtained, such as when security expectations can be evaluated without access to the cryptographic key and when such evaluation results in no need to access the cryptographic key.

In an embodiment, the cryptography service or a component therein evaluates 512 the request in accordance with the security expectations. The evaluation may be performed by a component such as the expectation evaluation engine described above in FIG. 2. For example, if so indicated by the applicable security expectations, the evaluation may include determining whether the cryptographic key to be used to fulfill the cryptographic operation should be trusted. The evaluation may have various modes of operation. Modes of operation determine how the trustedness of the cryptographic key is evaluated. In some embodiments, the modes of operations may be specified in the request, or may be set by the cryptography service.

In some embodiments, modes of operation may include a disabled state, a default mode of operation, or a TRUSTKEY mode of operation. The disabled state of operation refers to a mode of operation where validation is turned off in this step. This state of operation presents performance advantages over other modes of operation and may be used in some embodiments wherein the computing system is inherently secure (e.g., a trustworthy computing environment). The default mode of operation may be a mode of operation where the validation of the cryptographic key used to fulfill the cryptographic operation is based on an encoded policy. Examples of default mode of operation may include evaluating all requests such that cryptographic keys used to fulfill the cryptographic operation must be a key from the principal account. The TRUSTKEY mode of operation may be a mode of operation where the validation of the policy is attached to the principal making the call. In an embodiment, the policy management module is used to lookup to determine whether there exists a security policy associated to the principle that allows for the TRUSTKEY action against the cryptographic key. In the DECRYPT example, the operation will successfully decrypt and provide the plaintext where there exists a security policy associated with the calling client that allows the TRUSTKEY action against the ciphertext file/resource. In the example of digital signature verification, a positive response would indicate both that the digital signature is correct and that the key used to verify the digital signature's correctness is trusted.

A response is generated and provided 514 (e.g., transmitted over a network) based on the evaluation of the security expectations. In cases where the security expectations are satisfied, the operation is completed and an appropriate response (e.g., the plaintext result of decrypting a ciphertext) may be provided. In some embodiments, failing to satisfy the security expectations (e.g., absence of a policy allowing the TRUSTKEY action) may result in a failure being returned to the client.

Figure 6:
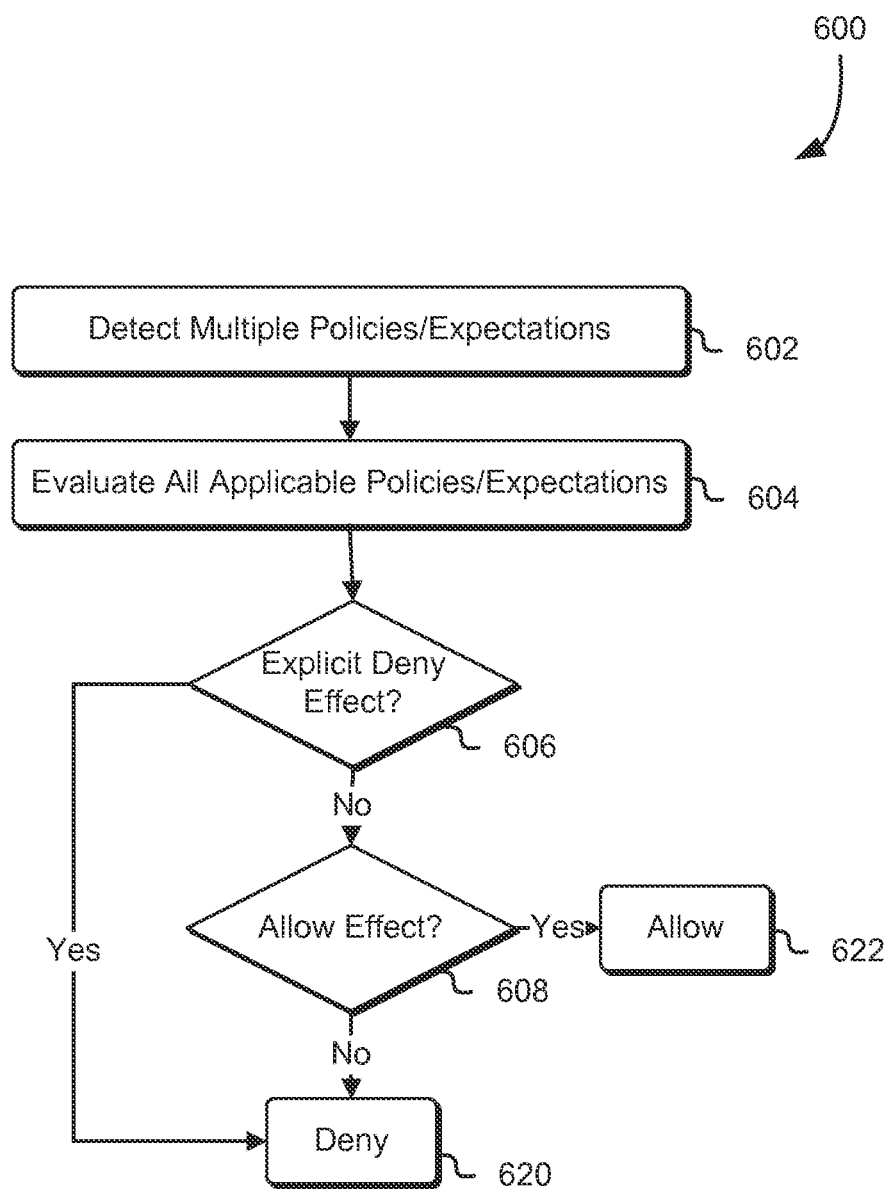
FIG. 6 is an illustrative process for resolving conflicts between multiple security policies and/or multiple security expectations in accordance with an embodiment.

FIG. 6 describes an illustrative example of a process 600 for resolving conflicts between multiple applicable security policies. The process 600 may be performed by any suitable system, such as the cryptography service or a component thereof. For instance, when performed with respect to security policies, the policy enforcement module described above may perform the process 600. In some embodiments, the cryptography service may obtain multiple security policies when handling a request (e.g., in accordance with the process described in FIG. 5 and as described above in connection with FIG. 2). Upon detecting 602 that two or more policies are to be evaluated, the policies are each evaluated 604, and the result of each of the individual policies/expectations are determined. The result of individual policy results may then be stored in a transient (e.g., RAM or a temporary cache) or persistent (e.g., hard disk or network storage) medium while subsequent evaluations are being computed. In some embodiments, the evaluations may be made in a parallelized or distributed manner.

Upon completing all of the evaluations, conflicts are resolved by first checking 606 whether there are any explicit effects to deny access. An explicit deny may arise from a security policy with an effect to DENY. If an explicit deny is detected, the result of the conflict resolution is that the request will be denied access to the resource. However, if there are no explicit denies and at least one allow effect is detected 608, the request will be allowed 622, meaning that the result of the conflict resolution is to allow 622 access to the resource.

Similar processes may be performed when evaluating security expectations. For example, for a particular type of API call (e.g., DECRYPT or VERIFY_SIGNATURE), there may be default ways of fulfilling the request which may be overridden by effects stated explicitly in security expectations. For instance, the default for DECRYPT may be to provide decrypted ciphertext unless a security expectation requires the decryption key used to be trusted and, when such a requirement is not met, the request may be denied. As another example, the default for VERIFY_SIGNATURE may be to provide a response that indicates whether a digital signature is correct regardless of trustedness of the key used to check correctness unless a security expectation requires the key to be specified as trusted. With such security expectations, a request to verify a digital signature using a non-trusted key may be processed by providing a response that indicates an inability to verify the digital signature or, in some embodiments, a response that indicates that the digital signature is correct but untrusted. Default manners of fulfilling requests may vary in accordance with various embodiments, on an account-by-account basis, and/or in other ways. For instance, in some contexts, the default may ensure greater security unless a security expectation explicitly allows less security (e.g., digital signature verification with an untrusted key or decryption with an untrusted key).

Figure 7:
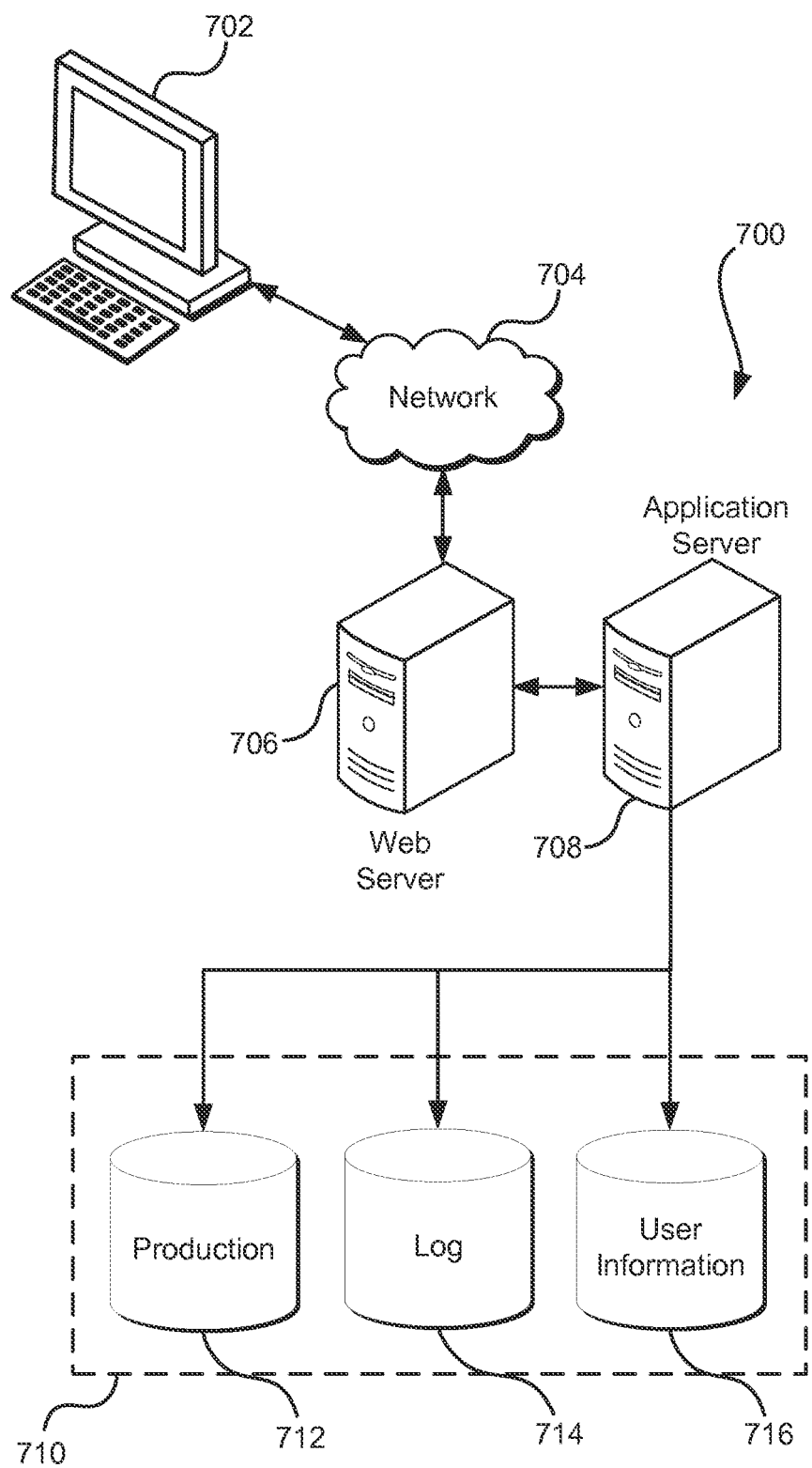
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a requestor associated with a customer of a service provider, a web service request whose fulfillment includes performance of a cryptographic operation;
   selecting, based at least in part on information in the web service request, a cryptographic key from a plurality of cryptographic keys managed by the service provider for a plurality of customers of the service provider;
   determining a set of security expectations applicable to the web service request, the set of security expectations defining a set of conditions applicable to the selected cryptographic key that, when fulfilled and regardless of whether the selected cryptographic key is usable to perform the cryptographic operation, indicate that a result of the cryptographic operation is trusted;
   evaluating the set of security expectations against the selected cryptographic key;
   generating a response to the web service requests based at least in part on evaluation of the set of security expectations; and
   providing the generated response.

2. The computer-implemented method of claim 1, wherein the set of security expectations are specified in the request.

3. The computer-implemented method of claim 1, wherein:
   the method further comprises:
   determining, a set of policies applicable to the request, the set of policies from a stored plurality of policy documents; and
   determining that the set of policies allows fulfillment of the request; and
   determining the set of security expectations includes determining at least one security expectation from the determined set of policies.

4. The computer-implemented method of claim 3, wherein the method further comprises:
   receiving, from an entity authorized by the customer to modify policies, a web service request to enforce the set of security expectations to a set of policies associated with the customer; and
   fulfilling the request by modifying the set of policies to include the set of security expectations.

5. The computer-implemented method of claim 3, wherein the cryptographic operations is decryption or digital signature verification.

6. A system, comprising at least one computing device configured to implement one or more services, the one or more services configured to:
- receive, from a client, a request to perform a cryptographic operation;
- determine a cryptographic key for performance of the cryptographic operation, the cryptographic key being from a set of cryptographic keys managed by the system;
- determine, based at least in part on information contained in the request, a set of conditions under which a result of performance of the cryptographic operation should be trusted by the client;
- generate, based at least in part on the cryptographic key and the determined set of conditions, a response to the request; and
- provide the generated response to the client.

7. The system of claim 6, wherein the one or more services are further configured to determine at least one condition of the set of conditions as a result of the at least one condition being specified in the request.

8. The system of claim 6, wherein:
the client is authenticated as an identity; and
the one or more services are configured to determine the set of conditions by at least:
- selecting a subset of a set policies as applicable to the identity; and
- determining at least one condition of the set of conditions as a result of the at least one condition being specified in the subset of the set of policies.

9. The system of claim 8, wherein:
the system is operated by a service provider; and
the set of policies is programmatically modifiable by a customer of the service provider associated with the identity.

10. The system of claim 6, wherein the system is a device with hardware-based protection of the set of cryptographic keys and from which the cryptographic keys are programmatically unexportable from the device in plaintext form.

11. The system of claim 6, wherein:
the cryptographic key is managed by the system on behalf of a first customer of a service provider; and
the set of cryptographic keys comprises a second cryptographic key that is managed by the system on behalf of a second customer of the service provider.

12. The system of claim 11, wherein the client is operated by a third customer of the service provider.

13. The system of claim 6, wherein the generated response includes information indicating a result of evaluation of the set of conditions.

14. The system of claim 6, wherein the set of conditions require that the cryptographic key be from a set of cryptographic keys specified as trusted.

15. A non-transitory computer-readable storage medium having stored thereon executable instructions that, when executed by one or more processors of a computer system, cause the computer system to provide a service that is configured to:
- determine, based at least in part on information included in a request, from a requestor, whose fulfillment involves a cryptographic operation involving a cryptographic key, a set of conditions applicable to the cryptographic key for determining whether the requestor should trust a result of the cryptographic operation, the cryptographic key being from a set of cryptographic keys managed by the computer system for a plurality of entities, each with a corresponding subset of the set of cryptographic keys;
- evaluate the determined set of conditions to determine a manner of fulfilling the request; and
- as a result of evaluation of the determined set of conditions indicating the cryptographic key can be trusted, causing the cryptographic operation to be performed and the result of the cryptographic operation to be provided in response to the request.

16. The non-transitory computer-readable storage medium of claim 15, wherein the entities are customers of a service provider that operates the computer system.

17. The non-transitory computer-readable storage medium of claim 15, wherein the instructions that cause the computer system to determine the set of conditions, when executed by the one or more processors, cause the system to obtain at least one condition of the set of conditions from a policy associated with an identity that submitted the request.

18. The non-transitory computer-readable storage medium of claim 15, wherein the request is a web service request.

19. The non-transitory computer-readable storage medium of claim 15, wherein the the set of conditions are based at least in part on an inherent property of the cryptographic key.

20. The non-transitory computer-readable storage medium of claim 15, wherein at least one condition from the determined set of conditions is specified by the request.

21. The non-transitory computer-readable storage medium of claim 20, wherein the set of conditions includes multiple conditions connected with Boolean operators.

22. The non-transitory computer-readable storage medium of claim 15, wherein the instructions further include instructions that, when executed by the one or more processors, cause the computer system to evaluate a set of policies applicable to the request as a prerequisite to evaluation of the determined set of conditions.

* * * * *